United States Patent [19]

Kämpf et al.

[11] 4,144,934
[45] Mar. 20, 1979

[54] ARRANGEMENT FOR CHANGING THE TEMPERATURE OF FLUIDS WHICH FORM INCRUSTATIONS

[75] Inventors: Fritz Kämpf; Hans-Georg Kaltenberg, both of Lünen, Fed. Rep. of Germany

[73] Assignee: Vereinigte Aluminium-Werke A.G., Bonn, Fed. Rep. of Germany

[21] Appl. No.: 822,533

[22] Filed: Aug. 8, 1977

Related U.S. Application Data

[60] Division of Ser. No. 500,123, Apr. 23, 1974, Pat. No. 4,055,218, which is a continuation-in-part of Ser. No. 222,757, Feb. 2, 1972, abandoned.

[51] Int. Cl.² .................. F28F 19/00; B01D 1/28; F28F 13/14
[52] U.S. Cl. .................. 165/134 R; 159/2 MS; 159/46; 159/DIG. 13; 165/144; 202/173
[58] Field of Search .................. 165/95, 144, 134; 159/2 MS, 46, DIG. 13; 202/173; 203/7

[56] References Cited

U.S. PATENT DOCUMENTS

| | | | |
|---|---|---|---|
| 3,497,317 | 2/1970 | Tusche | 159/46 |
| 3,951,752 | 4/1976 | Roller | 159/DIG. 13 |
| 4,054,493 | 10/1977 | Roller | 159/DIG. 13 |

OTHER PUBLICATIONS

Study of 150 MGD Desalted Water–Power Dual Plant for Southern California, Gilstaun et al., 10/65.

*Primary Examiner*—Charles J. Myhre
*Assistant Examiner*—Sheldon Richter
*Attorney, Agent, or Firm*—Darby & Darby

[57] ABSTRACT

A fluid medium is conveyed along a conduit. During its passage through the conduit, the fluid medium undergoes temperature change. The change in temperature of the fluid medium is performed in a step-wise manner by indirect heat-exchange with a fluid flowing countercurrent to the fluid medium, that is, by means of a plurality of heat-exchangers arranged along the conduit. The fluid medium forms incrustations and the rate at which incrustations form is different at different temperatures. This is taken into account by providing for the ratio between the lengths of any two heat-exchangers to approximate the ratio between the rates at which incrustations form at the temperatures of the respective heat-exchangers. Of particular interest is the extraction of bauxite with sodium aluminate lye.

7 Claims, 2 Drawing Figures

ARRANGEMENT FOR CHANGING THE TEMPERATURE OF FLUIDS WHICH FORM INCRUSTATIONS

CROSS-REFERENCE TO RELATED APPLICATIONS

This application is a division of our copending application Ser. No. 500,123 filed Apr. 23, 1974, now U.S. Pat. No. 4,055,218, which is a continuation-in-part of Ser. No. 222,757 filed Feb. 2, 1972 and entitled "Method and Apparatus for the Continuous Extraction of Bauxite, now abandoned.

BACKGROUND OF THE INVENTION

The invention relates generally to processes wherein a fluid which forms incrustations undergoes temperature change. Of particular interest is the extraction of bauxite with sodium aluminate lye.

It is already known to continuously extract bauxite from a suspension which also contains sodium aluminate lye by passing the suspension through a conduit under pressures of 10–200 atmospheres, at temperatures of 150°–300° C. and under conditions of turbulent flow at flow speeds of 0.5–7 meters per second. Preferred flow speeds are between 2 and 5 meters per second.

As the suspension is pumped through a conduit under high pressure in an apparatus provided for this purpose, it passes through heat-exchangers into which vapors are admitted from devices provided for expansion of the suspension. These heat-exchangers are followed by one or more additional heat-exchangers which are heated with high-pressure steam, diphenyl vapors, a liquid organic heat carrier, a salt melt or the like.

In the known apparatus, it is known to physically dimension all of the heat-exchangers in accordance with the quantity of heat which is to be transmitted. This quantity of heat is selected so as to be the same everywhere along the length of the conduit and, consequently, the heat-exchangers are all of the same physical dimensions. Quite surprisingly, however, it has been found that the formation of incrustations, which latter result from the suspension, differs extremely in the regions of the different heat-exchangers. As a result of this, the heat exchanged in the individual heat-exchangers varies greatly because the heat-exchangers are all of identical dimensions. This, in turn, has the result that the desired temperatures in the individual conduit sections provided with these heat-exchangers cannot be maintained over an extended period of time so that the operation of the apparatus is not at its optimum. Due to the fact that the apparatus does not operate at the optimum, the passage time of the suspension becomes too short to insure proper heating thereof or, to avoid this, it becomes necessary to make the apparatus of larger dimensions than would inherently be required if proper operation could be assured.

SUMMARY OF THE INVENTION

It is a general object of the invention to provide a novel method and arrangement for use in processes wherein a fluid which forms incrustations undergoes temperature change.

Another object of the invention is to provide a method and arrangement for chainging the temperature of a fluid which forms incrustations whereby the operating time, before cleaning is required to remove the incrustations, may be increased over what was possible heretofore.

A further object of the invention is to provide a method and arrangement for changing the temperature of a fluid which forms incrustations whereby the fluid temperature at the end of a given temperature changing operation may exhibit the greatest possible constancy.

An additional object of the invention is to provide a method and arrangement for use in processes wherein a fluid which forms incrustations undergoes temperature change whereby optimum conditions for the process may be achieved with smaller apparatus than was possible heretofore.

One more object of the invention is provide a method for the extraction of bauxite with sodium aluminate lye which is improved over the prior art methods and which enables the extraction to be performed under optimum conditions.

It is also an object of the invention to provide an arrangement for the extraction of bauxite with sodium aluminate lye which is improved over the prior art arrangements and which may be optimally dimensioned to correspondence to the reaction conditions and operating difficulties associated with bauxite extraction.

In pursuance of these objects and of others which will become apparent hereafter, one feature of the invention resides in a method of effecting a temperature change of fluids which form incrustations wherein a fluid medium to undergo temperature change is conveyed along a predetermined path. The temperature of the fluid medium is changed along a first segment of the path which is maintained substantially at a first temperature at which the fluid medium forms incrustations at a first rate. The first segment of the path has a first length. The temperature of the fluid medium is also changed along a second segment of the path which is maintained substantially at a second temperature at which the fluid medium forms incrustations at a second rate. The second segment of the path has a length such that the ratio of the first and second lengths substantially equals the ratio of the aforesaid first and second rates at which incrustations form.

The invention further provides an arrangement for effecting a temperature change of fluids which form incrustations which includes means defining a flow path for a fluid medium and means for conveying the fluid medium along the path. First temperature changing means, e.g. a heat-exchanger, extends for a first distance along the path and is adapted to be maintained substantially at a first temperature at which the fluid medium forms incrustations at a first rate. Second temperature changing means, e.g. a heat-exchanger, extends for a second distance along the path and is adapted to be maintained substantially at a second temperature at which the fluid medium forms incrustations at a second rate. The first and second distances for which the respective first and second temperature changing means extend along the path are in a ratio which substantially equals the ratio of the first and second rates at which incrustations form.

Of special interest to the invention is the extraction of bauxite with sodium aluminate lye, particularly the continuous extraction of bauxite with sodium aluminate lye. Thus, the description herein will be with reference to such extraction although it will be appreciated that the principles of the invention are applicable to other processes also.

In order to obtain a better understanding of the invention, it may be pointed out that an apparatus for the extraction or decomposition of bauxite is, in general, optimally utilized when the various parts thereof which come into consideration become incrustated after the same operating period, that is, when cleaning becomes necessary for each of the parts concerned at about the same time. However, for a given operating period, the intensity of incrustation normally depends upon the particular temperature involved. In accordance with the invention, account is taken of the difference in growth of the incrustations at different temperatures by providing for the heat-exchange surfaces of those heat-exchangers which tend to be more strongly incrustated to be of larger dimensions than would be selected conventionally. For example, if the formation of incrustations at 170° C. amounts to 1.5 times that which occurs at 140° C., then, according to the invention, the length of a heat-exchanger operating at 140° C. would be selected so as to be about 1.5 times the length of a heat-exchanger operating at 140° C. Hence, both heat-exchangers would become fully incrustated after the same operating period and maximum utilization of the apparatus may be insured since the heat-exchange occurring in the two heat-exchangers would begin to decrease at about the same time due to the incrustations. In this manner, it becomes possible to insure that, despite the different intensity of incrustation in the various heat-exchangers. The final temperature achieved in each heat-exchanger may be maintained substantially constant for a maximum period of time so that, as a result, the periods of uninterrupted operation may be maximized.

As will be appreciated, it is advantageous, according to the present invention, when the dimensions, that is, the lengths, of the heat-exchangers in longitudinal direction of the flow path or conduit are chosen in accordance with the degree to which incrustations form in the different conduit sections. According to a particularly favorable embodiment of the invention, the heat available from the suspension which has already been heated is used for heating the suspension which is to be heated. Here, it is of advantage for eight expansion devices to be provided for expansion of the suspension which has been heated and for each of these expansion devices to be associated with a heat-exchanger. It is of further advantage when an additional heat-exchanger through which the suspension to be heated first passes is also provided and when expanded lye from the expansion devices is passed through this additional heat-exchanger in order to better utilize the available heat. In such a case, it has been found that, with a given length $x_o$ of the first heat-exchanger, the lengths of the following heat-exchangers are advantageously as follows in the successive conduit sections where the temperature is higher: $1.5x_o$, $1.7x_o$, $2x_o$, $2.9x_o$, $3.9x_o$, $1.8x_o$, $2x_o$ and $3.1x_o$. Thus, if there are nine heat-exchangers present as in this illustration, then the ratios of the lengths of the consecutive heat-exchangers are favorably as follows: $x_o:1.5x_o:1.7x_o:2x_o:2.9x_o:3.9x_o:1.8x_o:2x_o:3.1x_o = 1:1.5:1.7:2:2.9:3.9:1.8:2:3.1$. The ratios of the lengths of the individual heat-exchangers are selected in such a manner that, despite the differences in the intensity of incrustation in the individual heat-exchangers, the final tmeperature achieved in each heat-exchanger does not change, that is, remains substantially constant, over an extended period of time, at least for the case where heating of the apparatus is otherwise unimpeded. The periods of uninterrupted operation are then substantially longer than would be the case if the dimensions according to the invention are not maintained since, in the latter event, changes in the final temperatures obtained in the various heat-exchangers will, of necessity, occur.

If fewer or more expansion devices and heat-exchangers than the eight expansion devices and nine heat-exchangers in the above illustration are present, then the ratios may be changed accordingly. For instance, if only three expansion devices and four heat-exchangers may be summed up meaning that the lengths of the heat-exchangers may have the relationships $(x_o + 1.5x_o + 1.7x_o):(2x_o + 2.9x_o + 3.9x_o):(1.8x_o + 2x_o + 3.1x_o)$ again assuming the length of the first heat-exchanger to be $x_o$. Thus, the ratios of the lengths of the three consecutive heat-exchangers following the first heat-exchanger may be 4.2:8.8:6.9. The ratios may be determined analogously if fewer or more than four heat-exchangers are present.

It may be mentioned that a reduction in the number of heat-exchangers from the nine in the illustration above is usually accompanied by unfavorable operating conditions. The reason for this resides in that, for the same overall temperature increase, the increase must be accomplished with fewer temperature increments when fewer heat-exchangers are present. For the case of nine heat-exchangers, a given overall temperature increase for the suspension may be achieved with eight temperature increments whereas, for example, in the case of four heat-exchangers, the same overall temperature increase must be achieved with three temperature increments. Also, when fewer heat-exchangers are present, it may be necessary to work with fewer expansion devices. The result of working with fewer heat-exchangers may then be that the apparatus is not fully utilized.

For maximum heat utilization, it is advantageous to select a temperature difference between consecutive expansion devices and, equivalently, between consecutive heat-exchangers, which is a small as possible. Such temperature difference is advantageously so selected that it exceeds the boiling point increase of the suspension to be heated by an amount such that the expanded vapors of the already heated suspension which are to be used for heating purposes have a temperature which differs sufficiently from the temperature of the suspension to be heated to enable the vapors to heat the suspension in heat-exchangers which are of an economically feasible size. With the term boiling point increase, there is understood the difference between the temperature of the liquid under consideration and the temperature of boiling water.

In contrast, a subdivision of the apparatus into more than nine heating stages, i.e. the use of more than nine heat-exchangers, for instance, a subdivision of the apparatus into eighteen heating stages, may make parallel operation of the different stages necessary. The reason for this resides in that an interposition of additional heating stages in the nine heating stages of the earlier-mentioned illustration may result in an insufficient temperature difference between adjacent stages. This, in turn, may lead to a reduction in the economy of the operation and, moreover, may require heat-exchangers of significantly greater size.

The novel features which are considered as characteristic for the invention are set forth in particular in the appended claims. The invention itself, however, both as to its construction and its method of operation, together

DESCRIPTION OF THE PREFERRED EMBODIMENTS

Figure 1:
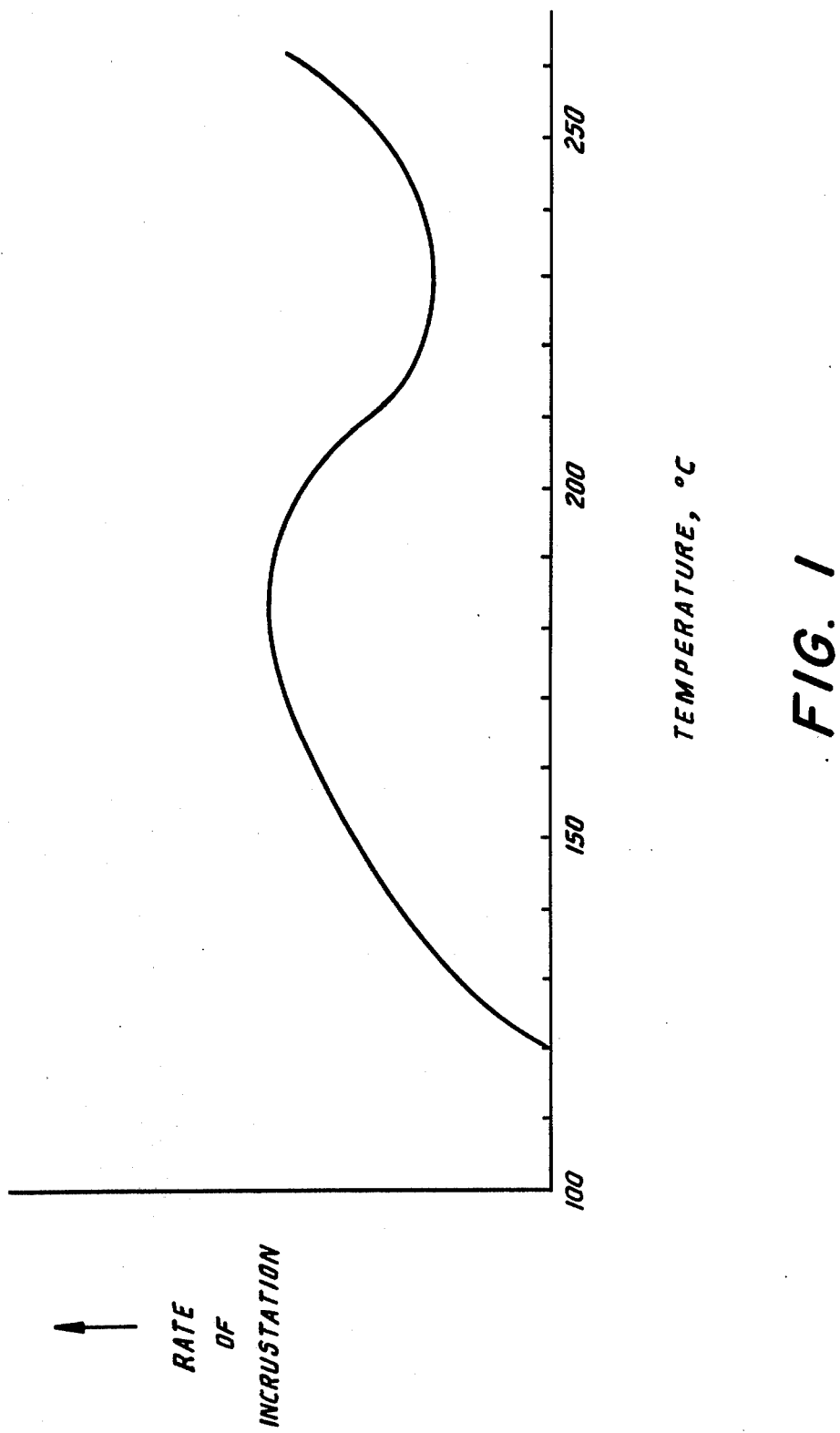
FIG. 1 represents graphically and somewhat schematically the variation of the rate of incrustation with temperature for a suspension of bauxite and sodium aluminate lye.

Referring first to FIG. 1, it may be seen that this illustrates the approximate variation of the rate at which a suspension of bauxite and sodium aluminate lye forms incrustations as a function of temperature. The graph extends to temperatures of approximately 250° or 260° C. since most types of bauxite will be substantially completely decomposed or extracted at such temperatures.

It will be seen that, upon heating of a suspension of bauxite and sodium aluminate lye, the rate of formation of incrustations initially increases with increasing temperature starting from temperatures of the order of 120° to 130° C. The rate of formation reaches a peak at temperatures of about 170° to 190° C. (sodium aluminum silicates are formed which deposit on the walls of the conduit through which the suspension flows) and thereafter decreases to a certain minimum value. At temperatures of approximately 220° to 240° C., the rate of formation begins to increase once more and continues to increase to the final temperatures under consideration here (titanate incrustations may form at these higher temperatures).

In accordance with the invention, the heat-exchangers used for heating the suspension are dimensioned in dependence upon the temperatures at which they operate and, hence, in dependence upon the rate at which incrustations form therein. For example, if a heat-exchanger operating at 135° C. has a length of $1.5x_o$, then, for a given operating period, this heat-exchanger would become incrustated to the same degree as a heat-exchanger operating at 150° C. and having a length of $1.7x_o$. In order to achieve the equivalent degree of incrustation in the same operating period, a heat-exchanger operating at about 190° C. would require a length of $3.9x_o$; a heat-exchanger operating at about 225° C. would require a length of $2x_o$; and so on.

Thus, the heat transfer, that is, the quantity of heat transmitted from one medium to another, e.g. from the expanded vapors to the suspension to be heated, may always be of about the same magnitude for all of the heat-exchangers. In this connection, it should be mentioned that, according to the invention, it is of advantage for the temperature difference between the medium effecting the heating and the medium to be heated to be approximately the same for each heat-exchanger. Furthermore, by proceeding in accordance with the invention, all of the heat-exchangers will become fully incrustated after the same interval of operating time and, therefore, the apparatus will be fully, that is, optimally, utilized for the entire operating period.

Figure 2:
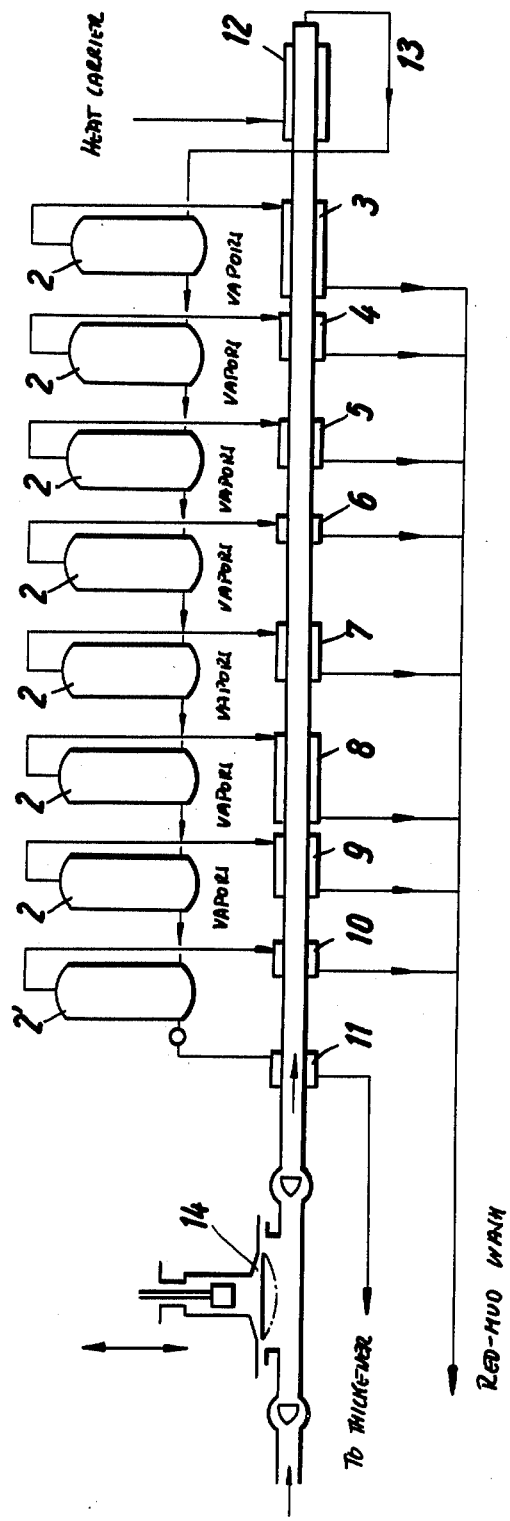
FIG. 2 is a diagrammatic illustration of one form of an arrangement according to the invention which may be used for carrying out the method of the invention.

FIG. 2 diagrammatically represents an arrangement which may be used in the extraction of bauxite with sodium aluminate lye. The reference numeral 1 illustrates a reaction conduit having a length which is dependent upon the volume of the bauxite-sodium aluminate suspension which is to be introduced per unit of time as well as upon the diameter of the conduit 1 itself. The length of the conduit 1 may, for instance, be between 300 and 3,000 meters.

A suspension of bauxite in sodium aluminate lye is admitted into the conduit 1 via a high-pressure pump 14, here assumed to be a piston membrane pump. The suspension may, for example, be admitted into the conduit 1 at a temperature of approximately 70° C. and a pressure of about 100 atmospheres. During its passage through the conduit 1, the suspension is heated in steps or stages until the decomposition or recovery temperature of the bauxite is attained. The flow speed with which the suspension is made to pass through the conduit 1 may, for example, be 3 meters per second, and the quantity pumped may be 280 cubic meters per hour. At locations of the conduit 1 where incrustations are to be expected, it is advantageous to assure that higher flow speeds prevail than at other locations where the danger of formation of incrustations is less or does not exist.

In general, it is advantageous for the suspension to be passed through the conduit 1 in turbulent flow and at flow speeds between about 0.5 and 7 meters per second, preferably between about 2 and 5 meters per second. The suspension is favorably maintained under pressures of approximately 10 to 200 atmsopheres during passage thereof through the conduit 1 and it may be heated to temperatures between about 150° and 300° C. during its passage through the latter. The extraction of bauxite may be and, advantageously, is, performed continuously.

As already mentioned, heating of the suspension is carried out in stages. Thus, the conduit 1 has a plurality of sections which are provided whith heat-exchangers of various dimensions, the suspension being heated to a desired temperature in the respective sections and by means of the respective heat-exchangers. The reason that the suspension should be heated in stages resides in the fact that it is usually necessary for the suspension to undergo an overall temperature increase in excess of 100° C. and even up to the order of 200° C. An attempt to carry this out in a single heat-exchanger would most likely to provide fruitless because of the excessively large apparatus which would be required. Moreover, if it were attempted to effect such a large temperature increase in a single heat-exchanger, significant disadvantages would have to be taken into account arising from the fact that, due to the great temperature variance which would necessarily have to exist between the medium effecting the heating and the medium to be heated, an optimum, economical operating procedure cannot possibly be realized. On the other hand, by heating the suspension in a step-wise manner such that, for instance, a temperature increase of about 16° C. is effected in each heat-exchanger, it becomes possible to insure that the temperature difference between the medium effecting the heating and the medium to be heated is always of approximately the same magnitude, for example, 20° C. However, the temperature increase between consecutive heat-exchangers should not be chosen to be of too small a magnitude since, in such an event, a substantial number of additional heat-exchangers would be required in order to permit heating of the suspension to the reaction or decomposition temperature to be achieved. Although such a larger number of heat-exchangers might favorably effect the heat efficiency, it disadvantageously influences the investment costs related to the overall apparatus.

Referring once more to FIG. 2, the diagrammatic apparatus shown and with which the invention is to be illustrated comprises eight series-connected expansion devices 2,2' and nine heat-exchangers 3, 4, 5, 6, 7, 8, 9, 10, and 11. Although this number of expansion devices and heat-exchangers is advantageous for reasons which will be outlined more fully below, this number of expansion devices and heat-exchangers is nevertheless to be considered as exemplary only. The suspension which has been heated to the decomposition temperature of the bauxite in the conduit 1 leaves the latter via a conduit 13 and flows into the first (the right-hand one) of the expansion devices 2. Here, the suspension undergoes expansion and the vapors obtained may be conveyed into the heat-exchanger 3. The remainder of the suspension may flow into the next one of the devices 2 where it is again expanded and where the vapors obtained may be conveyed into the heat-exchanger 4. This is repeated through the series of expansion devices 2,2'. The expanded suspension finally withdrawn from the device 2', that is, the last expansion device in the direction of flow of the suspension during expansion, is passed through the heat-exchanger 11 and, from the latter, is advanced to be thickened. On the other hand, the material flowing out of the heat-exchangers 3–10 is conveyed to a red-mud wash.

Thus, the suspension being conveyed along the conduit 1 is first indirectly heated, in the heat-exchanger 11, by the heat of the expanded suspension withdrawn from the device 2' and is thereafter indirectly heated in the heat-exchanger 10 by the heat of the vapors obtained from the device 2'. Subsequently, the suspension is further indirectly heated in the consecutive heat-exchangers 9, 8, 7, 6, 5, 4, and 3 by the heat of the vapors obtained from the series of expansion devices 2. It may be seen that each of the devices 2 is associated with a respective one of the heat-exchangers 3, 4, 5, 6, 7, 8, and 9 whereas the device 2' is associated with the heat-exchangers 10 and 11.

In accordance with the invention, the heat-exchangers 3–11 are of various lengths. Thus, the heat-exchanger 11 has a length of $x_o$ whereas the lengths of the heat-exchangers which follow the latter in the flow direction of the suspension through the conduit 1 are related to the length $x_o$ in a manner which may be determined from FIG. 1. The length of a given one of the heat-exchangers 3–10 may be determined by establishing the operating temperatures of the heat-exchanger 11 and the heat-exchanger whose length is to be determined. The rates of incrustation corresponding to the respective operating temperatures may then be obtained from FIG. 1 and, thereafter, the ratio of the rates of incrustation may be calculated. The length of the heat-exchanger whose length is to be determined may finally be calculated by the following equality: (rate of incrustation for heat-exchanger 11)/(rate of incrustation for heat-exchanger whose length is to be determined) = (length of heat-exchanger 11)/(length of heat-exchanger whose length is to be determined). The absolute length $x_o$ is dependent upon the diameter of the conduit 1, upon the temperature difference of the lyes and upon the input temperature of the suspension and may be readily ascertained by carrying out experiments which are well within the scope of knowledge of those having ordinary skill in the art.

According to a favorable embodiment of the invention, the heat-exchanger 11 operates at a temperature of about 120° C. and the temperature difference between adjacent ones of the heat-exchangers 3–11 is approximately 15° to 16° C. In this case, the lengths of the heat-exchangers 11, 10, 9, 8, 7, 6, 5, 4, and 3 are, respectively, as follows: $x_o$, $1.5x_o$, $1.7x_o$, $2x_o$, $2.9x_o$, $3.9x_o$, $1.8x_o$, $2x_o$ and $3.1x_o$, that is, the lengths of consecutive ones of the heat-exchangers 11, 10, 9, 8, 7, 6, 5, 4, and 3 are in the ratios of 1:1.5:1.7:2:2.9:3.9:1.8:2:3.1. It will be apparent that the lengths and ratios just given are in order of increasing temperature. It is also pointed out that the operating temperature of the heat-exchanger 3 is here of the order of 240° to 250° C.

Referring briefly again to FIG. 2, it may be seen that, downsteam of the heat-exchanger 3, the conduit 1 is surrounded by a jacket 12 through which a heat carrier such as high-pressure steam, hot diphenyl vapors, a liquid organic substance or a salt melt may be passed for further heating purposes.

It has been mentioned earlier that the use of nine heat-exchangers is advantageous in accordance with the invention. In this connection, experiments have shown that, for the method and arrangement under consideration, nine heat-exchangers provide the most favorable results. If the number of heat-exchanger is increased, then the investment costs increase correspondingly while, concomitantly, no economic gains are realized. On the other hand, if the number of heat-exchangers is reduced, it is true that the investment costs are reduced. However, the overall economy is still less than might be desirable.

To obtain a fuller understanding of the advantage of using nine heat-exchangers, it is noted, as also pointed out previously, that the temperature difference between consecutive heat-exchangers is advantageously so selected that it exceeds the boiling point increase of the suspension to be heated by an amount such that the expanded vapors of the already heated suspension which are to be used for heating purposes have a temperature which differs sufficiently from the temperature of the suspension to be heated to enable the vapors to heat the suspension in heat-exchangers which are of an economically feasible size. Furthermore, the temperature difference between consecutive heat-exchangers is advantageously as small as possible. The boiling point increase of the lyes used generally lies between about 7° and 13° C. and, for the purposes of the present calculation, it may be assumed that the boiling point increase averages about 10° C.

The heating of the lye is performed in a stepwise manner and, in each heat-exchanger, a substantially constant temperature is generated which is substantially identical with the condensation temperature of the condensate flowing out of the respective heat-exchanger. The temperature in each heat-exchanger remains substantially constant over an extended period of time and is also substantially consant along its length. It will be appreciated that the temperature in an individual heat-exchanger is substantially identical with the condensation temperature of the condensate at the particular pressure involved.

Since practically all types of bauxite are substantially completely decomposed at temperatures of the order of 250° to 260° C. during the extraction of bauxite in the apparatus according to the invention, it follows logically that higher decomposition temperatures will rarely be selected in view of the additional unnecessary energy expenditure which would then be required. Furthermore, since a heating effect in the heat-exchangers will occur only when a sufficiently great temperature difference exists between the medium effecting the heating and the fluid to be heated, a temperature different of about 8° to 10° C. should still exist at the end of each heat-exchanger. If the aforementioned boiling point increases, i.e., an average of 10° C., are now added up for nine stages, then a total of approximately 90° C. is obtained. If now the temperature difference which should exist at the end of each heat-exchanger in order to insure proper heating of the fluid to be heated is considered, then, assuming a temperature difference for each heat-exchanger of 8° C., there is obtained 9° × 8° C. = 72° C. If the total of the boiling point increases and the temperature differences are added, a grand total of 162° C. is obtained. Assuming a starting temperature of 100° C., it may be seen that this calculation yields a final decomposition temperature of 262° C. This makes it clear that optimum results may be achieved with nine heat-exchangers.

It will be appreciated from the foregoing description that terms such as fluid and liquid are intended herein to encompass suspensions. It will also be appreciated that the principles of the invention might be applicable to the cooling of fluids as well as to the heating thereof.

It will be understood that each of the elements described above, or two or more together, may also find a useful application in other types of methods and arrangements differing from the types described above.

While the invention has been illustrated and described as embodied in a method and arrangement for the continuous extraction of bauxite, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters Patent is set forth in the appended:

1. An arrangement for effecting a temperature change of fluids which form incrustations, comprising:
   means defining a flow path for a fluid medium;
   means for conveying said fluid medium along said path;
   first temperature changing means extending for a first distance along said path and adapted to be maintained substantially at a first temperature at which said fluid medium forms incrustations at a first rate; and
   second temperature changing means extending for a predetermined second distance along said path and adapted to be maintained substantially at a second temperature at which said fluid medium forms incrustations at a second rate, said first and second distances being in a ratio which substantially equals the ratio of said first and second rates.

2. An arrangement for the extraction of bauxite with sodium aluminate lye, comprising:
   means defining a flow path for a suspension of bauxite and sodium aluminate lye;
   means for conveying said suspension along said path;
   means for heating a first segment of said path to a first temperature at which said suspension forms incrustations at a first rate, said first segment having a first length; and
   means for heating a second segment of said path to a second temperature at which said suspension forms incrustations at a second rate, said second segment having a predetermined second length, and the ratio of said first length to said second length being substantially equal to the ratio of said first rate and said second rate.

3. An arrangement as defined in claim 2, wherein said conveying means is effective for continuously conveying said suspension along said path.

4. An arrangement as defined in claim 2 wherein said conveying means comprises high-pressure pump means, and at least one of said heating means comprises indirect heat exchange means.

5. An arrangement as defined in claim 2, wherein at least one of said heating means comprises indirect heat-exchange means.

6. An arrangement as defined in claim 2, wherein at least one of said heating means comprises vapor expansion means.

7. An arrangement for the extraction of bauxite with sodium aluminate lye, comprising:
   means defining a flow path for a suspension of bauxite in sodium aluminate lye;
   means for conveying said suspension along said path;
   first heating means extending for a first distance along said path and adapted to be maintained substantially at a first temperature at which said suspension forms incrustations at a first rate;
   second heating means extending for a second distance along said path and adapted to be maintained substantially at a second temperature at which said suspension forms incrustations at a second rate, said first and second distances being in a ratio which substantially equals the ratio of said first second rates;
   seven additional heating means extending for respective distances along said path; and
   wherein consecutive ones of said heating means extend for distances which are in the ratios of 1:1.5:1.7:2:2.9:3.9:1.8:2:3.1, respectively.

* * * * *